United States Patent
Liotta et al.

[11] Patent Number: 5,993,150
[45] Date of Patent: Nov. 30, 1999

[54] DUAL COOLED SHROUD

[75] Inventors: Gary C. Liotta, Beverly; Paul J. Acquaviva, Maldon, both of Mass.

[73] Assignee: General Electric Company, Cincinnati, Ohio

[21] Appl. No.: 09/008,558

[22] Filed: Jan. 16, 1998

[51] Int. Cl.$^6$ .............................. F01D 5/14; F03B 11/00; F04D 31/00
[52] U.S. Cl. ............................................ 415/115; 415/116
[58] Field of Search ................................. 415/115, 116, 415/117, 176, 178

[56] References Cited

U.S. PATENT DOCUMENTS

| | | | |
|---|---|---|---|
| 3,583,824 | 6/1971 | Smuland et al. | 415/117 |
| 3,635,586 | 1/1972 | Kent et al. | 415/115 X |
| 3,742,706 | 7/1973 | Klompas | 415/115 X |
| 3,825,364 | 7/1974 | Halila et al. | 415/116 |
| 4,023,731 | 5/1977 | Patterson | 415/115 X |
| 4,222,707 | 9/1980 | Drouet et al. | 415/116 |
| 4,230,436 | 10/1980 | Davison | 415/175 X |
| 4,522,557 | 6/1985 | Bouiller et al. | 415/115 |
| 4,526,226 | 7/1985 | Hsia et al. | 415/116 X |
| 4,645,415 | 2/1987 | Hovan et al. | 415/115 |
| 4,901,520 | 2/1990 | Kozak et al. | 415/115 X |
| 5,048,288 | 9/1991 | Bessette et al. | 415/116 X |
| 5,134,844 | 8/1992 | Lee et al. | 415/116 X |
| 5,169,287 | 12/1992 | Proctor et al. | 415/115 |
| 5,562,408 | 10/1996 | Proctor et al. | |
| 5,584,651 | 12/1996 | Pietraszkiewicz et al. | |
| 5,593,277 | 1/1997 | Proctor et al. | |
| 5,611,197 | 3/1997 | Bunker | 415/115 X |

*Primary Examiner*—John E. Ryznic
*Attorney, Agent, or Firm*—Andrew C. Hess; Rodney M. Young

[57] ABSTRACT

A turbine shroud includes a panel having a forward hook and an aft hook spaced therefrom. A primary cooling circuit extends through the panel adjacent the forward hook, and has a primary inlet for receiving primary air at a first pressure, and a primary outlet for discharging the primary air. A secondary cooling circuit extends through the panel adjacent the aft hook independently of the primary circuit. The secondary circuit includes a secondary inlet for receiving secondary air at a second pressure different than the first pressure, and a secondary outlet for discharging the secondary air. The dual cooled shroud accommodates differential gas pressure through the turbine.

13 Claims, 4 Drawing Sheets

DUAL COOLED SHROUD

BACKGROUND OF THE INVENTION

The present invention relates generally to gas turbine engines, and, more specifically, to turbine shrouds.

A typical turbofan aircraft gas turbine engine includes a fan powered by a low pressure turbine (LPT) and a multistage compressor powered by a high pressure turbine (HPT). Ambient air flows in turn through the fan and compressor which provides compressed air to a combustor wherein it is mixed with fuel and ignited for generating hot combustion gases which flow in turn through the HPT and LPT which extract energy therefrom.

The turbines are defined by rotor blades extending radially outwardly from corresponding disks cooperating with stationary turbine nozzles disposed upstream therefrom. The nozzles direct the combustion gases between the turbine blades which extract energy therefrom for rotating the disk. Circumferentially surrounding the radially outer tips of the turbine blades is a stationary turbine shroud which defines a relatively small radial gap therebetween for reducing the amount of combustion gas leaking therethrough. The blade tip clearance should be as small as possible for maximizing efficiency of the engine.

The turbine shrouds are typically air cooled using a portion of compressor discharge air from the compressor outlet which is channeled to the radially outer or backside of the turbine shrouds. The turbine shrouds therefore experience a differential temperature between the hot combustion gases which flow along the radially inner surface thereof and the cooling air provided on the backside thereof. This differential temperature affects the blade tip clearance over the various power settings of the engine, and therefore the turbine shrouds must be suitably supported for minimizing blade tip clearance variation.

In practice, the turbine shroud is an assembly or system of discrete turbine shroud segments circumferentially adjoining each other. Each segment includes forward and aft hooks which engage corresponding forward and aft hooks of an annular shroud hanger mounted in turn to a surrounding annular shroud support. The main purpose of the shroud hanger is to support the shroud segments and isolate the shroud support from the hot shroud itself. The shroud support generally controls the radial growth of the shroud segments and, therefore, the blade tip clearance.

The shroud is typically cooled by the high-pressure compressor discharge air channeled thereto through apertures in either the hanger or the shroud support. An impingement baffle is typically provided on the backside of the shroud through which the cooling air is channeled for impingement cooling the shroud segments. The impingement air may then be channeled through the individual shroud segments or may leak around the edges of the shroud segments back to the main flowpath through which the combustion gases flow. For example, the individual shrouds may include inclined film cooling holes extending therethrough to provide a layer of film cooling air along the inner surface of the shroud for protection against the hot combustion gases flowing thereover during operation.

The purpose of the turbine rotor blades is to extract energy from the combustion gases which in turn creates a pressure drop over the blades. Accordingly, the gas pressure is highest at the leading edge of the blades near the forward end of the turbine shroud, and lowest near the trailing edge of the blades adjacent the aft end of the turbine shrouds. The gas pressure therefore varies axially between the forward and aft ends of the shroud.

This in turn increases the difficulty of effectively cooling the turbine shroud since its cooling air is provided at a single pressure. The differential pressure radially across the turbine shroud therefore increases from its forward end to its aft end which undesirably increases cooling air leakage and film cooling hole blowing ratio. Engine efficiency therefore suffers since any excess cooling air diverted to the turbine shroud does not undergo combustion for producing power during operation.

Accordingly, it is desired to provide a turbine shroud having improved cooling resulting in increased engine efficiency.

SUMMARY OF THE INVENTION

A turbine shroud includes a panel having a forward hook and an aft hook spaced therefrom. A primary cooling circuit extends through the panel adjacent the forward hook, and has a primary inlet for receiving primary air at a first pressure, and a primary outlet for discharging the primary air. A secondary cooling circuit extends through the panel adjacent the aft hook independently of the primary circuit. The secondary circuit includes a secondary inlet for receiving secondary air at a second pressure different than the first pressure, and a secondary outlet for discharging the secondary air. The dual cooled shroud accommodates differential gas pressure through the turbine.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
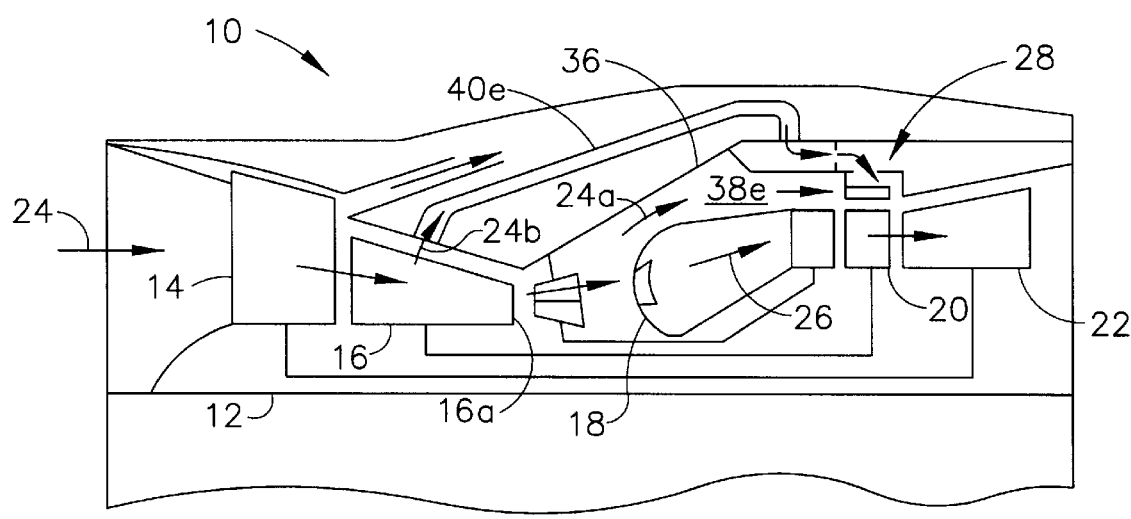
FIG. 1 is a schematic sectional view through a portion of an exemplary turbofan aircraft gas turbine engine including a high pressure turbine shroud in accordance with one embodiment of the present invention.

Illustrated schematically in FIG. 1 is an exemplary turbofan aircraft gas turbine engine 10 which is axisymmetrical about a longitudinal or axial centerline axis 1 2. The engine includes in serial flow communication a fan 14, multistage axial compressor 16, combustor 18, high pressure turbine (HPT) 20 fixedly joined by a rotor shaft to the compressor 16, and a low pressure turbine (LPT) 22 fixedly joined by another rotor shaft to the fan 14.

During operation, air 24 enters the engine and passes through the fan 14, with an inner portion of which entering the compressor 16 which sequentially compresses the air in each succeeding stage to increase the pressure thereof to a maximum pressure at an outlet 16a of the compressor. The air enters the combustor 18 wherein it is mixed with fuel and ignited for generating hot combustion gases 26 which flow downstream in turn through the HPT 20 and LPT 22 which extract energy therefrom for powering the compressor 16 and fan 14 during operation. The engine 10 as so described may have any conventional configuration, and is conventionally operated.

Since the HPT 20 is disposed immediately downstream of the combustor 18, it receives the highest temperature combustion gases 26 from which energy is extracted. In accordance with the present invention, a shroud assembly or system 28 surrounds the HPT 20 for providing an outer flowpath boundary to contain the combustion gases 26. The shroud assembly 28 is illustrated in more particularity in FIG. 2 cooperating with the single stage HPT 20.

The HPT 20 includes a plurality of circumferentially spaced apart turbine rotor blades 20a extending radially outwardly from a supporting disk. The turbine blades 20a are conventional and include a leading edge for first receiving the combustion gases 26, a trailing edge spaced axially downstream therefrom, and a radially outer tip extending axially therebetween. The HPT 20 also includes a stationary high pressure turbine nozzle 20b disposed immediately upstream therefrom and at the discharge end of the combustor 18. The turbine nozzle 20b is conventional and includes a plurality of circumferentially spaced apart nozzle vanes extending radially between outer and inner annular bands. The combustion gases 26 are directed through the turbine nozzle 20b and between the turbine blades 20a which extract energy therefrom and effect a decrease in pressure between the leading and trailing edges of the blades 20a.

Figure 2:
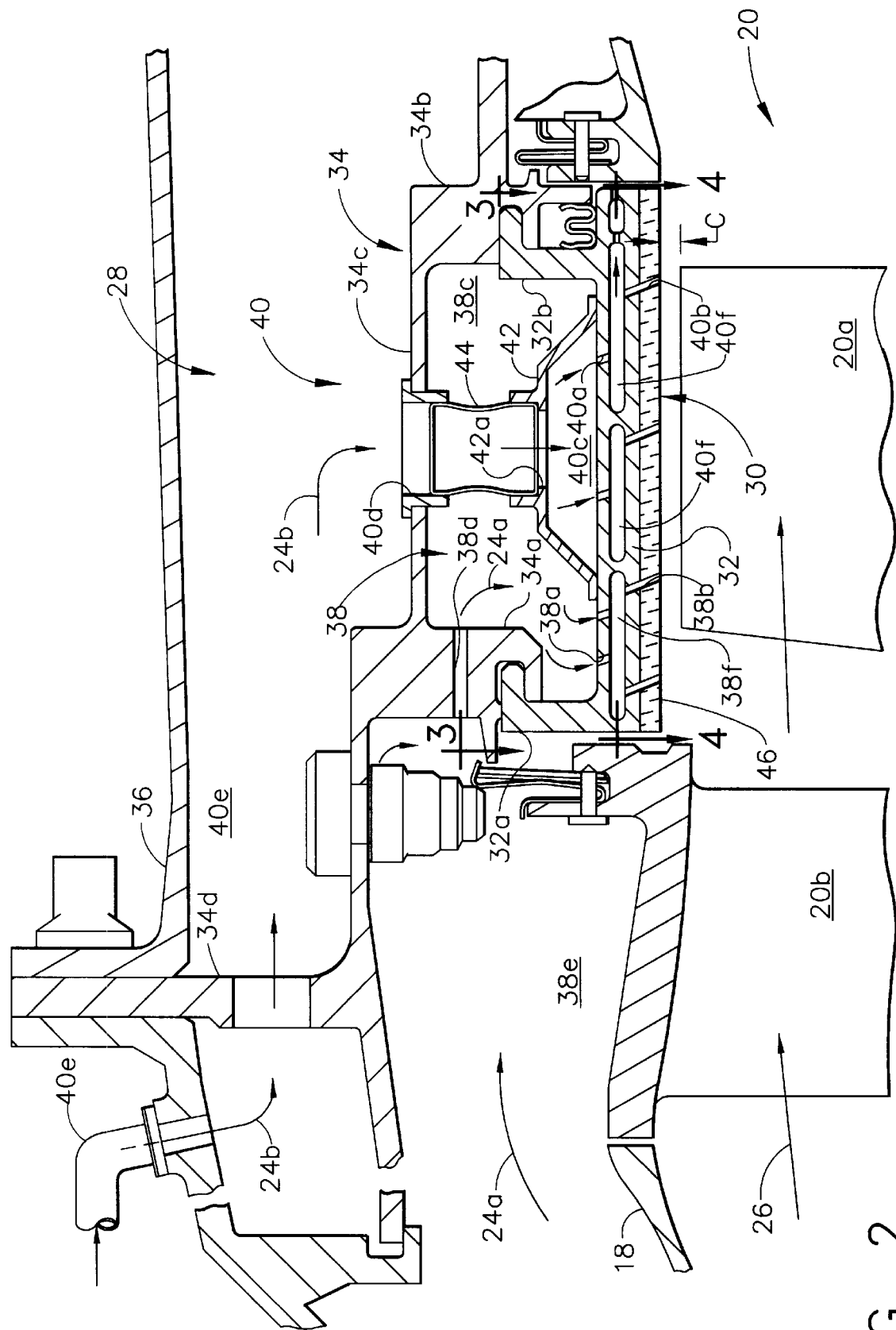
FIG. 2 is an enlarged, partly sectional elevational view of the high pressure turbine shroud illustrated in FIG. 1.
Figure 3:
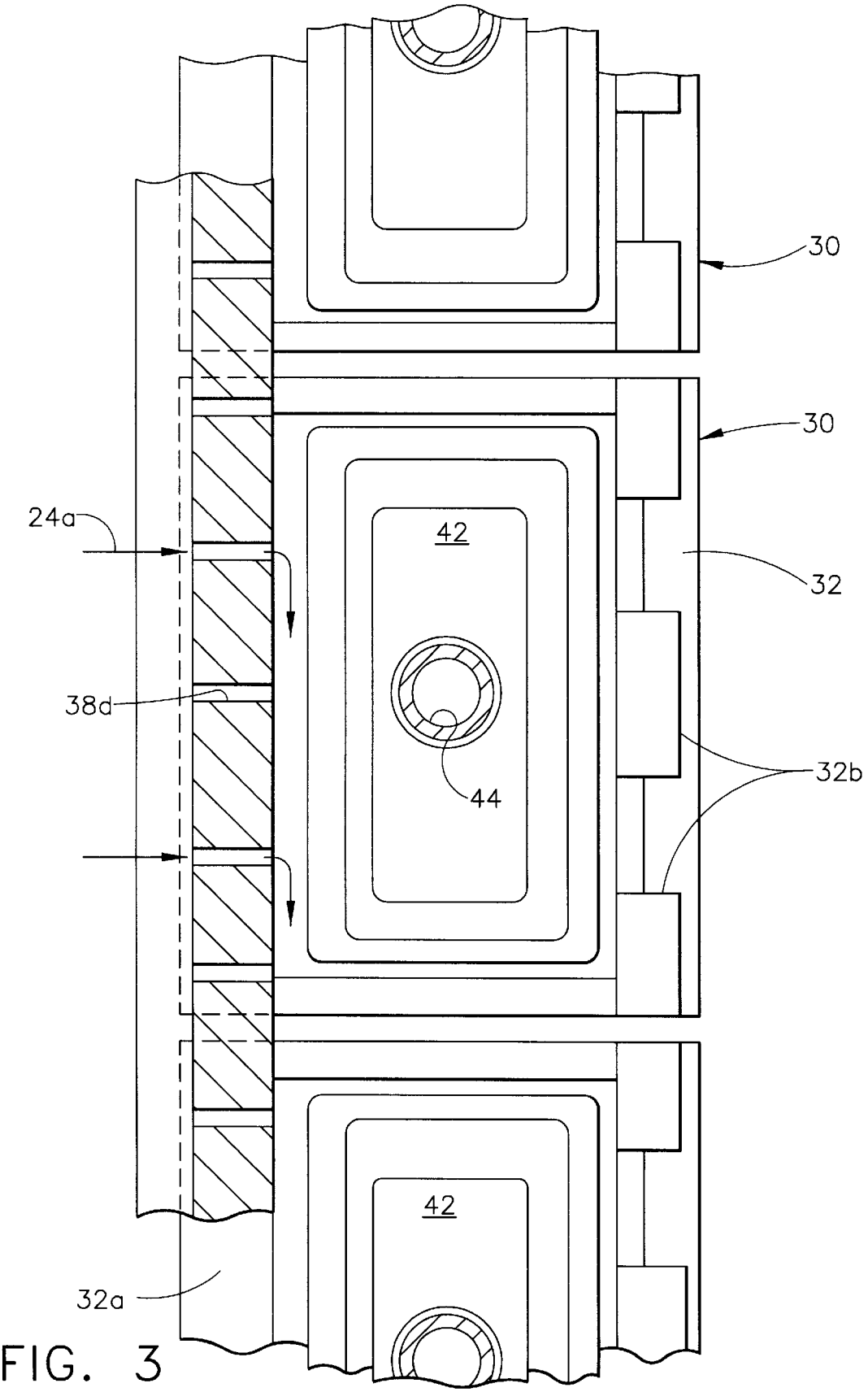
FIG. 3 is a partly sectional, plan view through the turbine shroud illustrated in FIG. 2 and taken along line 3—3.

In the preferred embodiment illustrated in FIGS. 2 and 3, the shroud assembly 28 includes a plurality of circumferentially adjoining individual shrouds or segments 30 which collectively surround the turbine blades 20a for providing an outer flowpath boundary for the combustion gases 26, with a relatively small tip gap or clearance C therebetween. The individual shrouds 30 are identical and each includes an arcuate plate or panel 32. The panel 32 includes a first or forward hook 32a and a second or aft hook 32b spaced axially downstream therefrom.

In the preferred embodiment illustrated in FIG. 2, the panels 32 are directly mounted to an annular shroud support 34 disposed radially outwardly of the shrouds 30 for positioning the shrouds radially outwardly of the turbine rotor blades 20a to effect the tip clearance C. The shroud support 34 includes forward and aft hooks 34a,b extending radially inwardly from an integral annular band 34c. The support hooks 34a,b are complementary to and engage the panel forward and aft hooks 32a,b, respectively. A mounting flange 34d extends radially outwardly from an intermediate portion of the band 34c for fixedly mounting the shroud support 34 to an annular inner casing 36 which surrounds the combustor and turbines.

In accordance with the present invention, means in the form of a primary cooling circuit 38 are provided for channeling primary cooling air 24a at a first pressure through a portion of the individual turbine shrouds 30. And, additional means in the form of a secondary cooling circuit 40 are provided for independently channeling secondary cooling air 24b at a second pressure different than the first pressure through another portion of each of the turbine shrouds 30. In this way, each turbine shroud 30 is cooled with two or dual sources of cooling air for accommodating the axial pressure drop in the combustion gases 26 as they flow downstream through the turbine blades 20a below the turbine shrouds 30.

As shown in FIG. 2, the primary circuit 38 preferably extends through each panel 32 adjacent the forward hook 32a, and has a primary inlet 38a in the form of one or more apertures in the outer surface of the panel 32 for receiving the primary air 24a at the first pressure. The primary circuit 38 also includes a primary outlet 38b in the form of one or more holes extending through the inner surface of the panels 32 for discharging the primary air into the combustion gas flowpath.

Similarly, the secondary circuit 40 extends through each panel 32 adjacent the panel aft hook 32b independently of the primary circuit 38. The secondary circuit 40 includes a secondary inlet 40a in the form of one or more holes in the outer surface of the panel 32 for receiving the secondary air 24b at the second pressure. The secondary circuit 40 also includes a secondary outlet 40b in the form of one or more holes extending through the inner surface of the panels 32 for discharging the secondary air 24b into the gas flowpath.

In the preferred embodiment illustrated in FIG. 2, a cap or hood 42 is sealingly joined, by brazing or welding for example, to the top of the panel 32 between the forward and aft hooks 32a,b and above the secondary inlets 40a to define a secondary plenum 40c in flow communication therewith for channeling the secondary air 24b thereto. The shroud support 34 above the panels 32 defines a primary plenum 38c surrounding the hood 42 and the secondary plenum 40c therein. The shroud support 34 further includes primary and secondary distribution holes 38d,40d disposed in flow communication with the primary and secondary plenums 38c, 40c, respectively, for independently channeling the primary and secondary air 24a,b thereto.

The hood 42 is open at its inner end for communicating with the secondary inlets 40a in the top of the panels 32. The top of the hood 42 includes a central hole 42a which is spaced radially inwardly of a corresponding one of the secondary distribution holes 40d in the shroud support 34. A tubular spool or spoolie 44 extends radially inwardly through the primary plenum 38c in flow communication between the secondary distribution hole 40d and the hood inlet hole 42a to channel the secondary air to the corresponding secondary inlets 40a in the panel. The panel 32 and hood 42 may be formed of a conventional shroud metal material and are relatively rigid. The spoolie 44 may be formed of a relatively thin metal for providing flexibility for accommodating differential thermal movement between the shroud support 34 and the hood 32 during operation. In this way, the relatively simple spoolie 44 functions like a conventional flexible bellows.

In order to independently channel the primary and secondary airflows to the primary and secondary plenums 38c,40c, suitable supply channels are formed in the engine in flow communication with the compressor 16 illustrated in FIG. 1. A primary supply channel 38e provides a flowpath disposed in flow communication between the compressor outlet 16a and the primary distribution holes 38d for channeling compressor discharge air at maximum pressure as the primary air 24a to the shrouds 30. The primary channel 38e may be defined between the inner casing 36 and the combustor 18 in any conventional manner used for cooling conventional turbine shrouds with single source compressor discharge air.

The secondary supply channel 40e defines a flowpath disposed in flow communication between a suitable intermediate stage of the compressor 16 from which partially compressed air is bled from the compressor 16 and channeled to the secondary distribution holes 40d to also feed the shrouds 30 with secondary air 24b at a lower pressure than the primary air 24a. In the exemplary embodiment illustrated in FIGS. 1 and 2, the secondary channel 40e may include a conduit or pipe extending from the compressor 16 to the inner casing 36 adjacent the shroud support 34.

Interstage bleed air is commonly used in aircraft engines for many purposes, and may now be similarly extracted for the new function in dual cooling of the turbine shrouds. For example, the compressor 16 may have seven stages, with the secondary air 24b bled from the fourth stage thereof. An aft portion of the secondary supply channel 40e as illustrated in more particularity in FIG. 2 may be defined radially between the shroud support 34 itself and the inner casing 36, with the shroud support 34 being suitably sealed from the primary supply channel 38e. Two independent flowpaths are therefore provided from the compressor at its outlet and interstage to the independent primary and secondary cooling circuits 38,40 of the turbine shrouds 30.

In this way, compressor discharge air 24a may be channeled from the compressor outlet 16a as the primary air to the forward portion of the individual shrouds 30. And, compressor bleed air 24b may be channeled from an intermediate stage of the compressor 16 as the secondary air to the aft portion of the turbine shrouds 30. Higher pressure cooling air is thereby provided at the shroud forward end corresponding with the leading edge of the turbine blades 20a having the greatest combustion gas pressure. And, lower pressure cooling air is provided at the turbine shroud aft end corresponding with the turbine blade trailing edge having reduced pressure exhaust gases. The radial differential pressure acting across the turbine shrouds 30 is therefore better matched both at the forward end of the shrouds 30 and at the aft end of the shrouds 30, as well as in between. In turn, this improves the cooling effectiveness of the dual-source air in the turbine shrouds 30.

Figure 4:
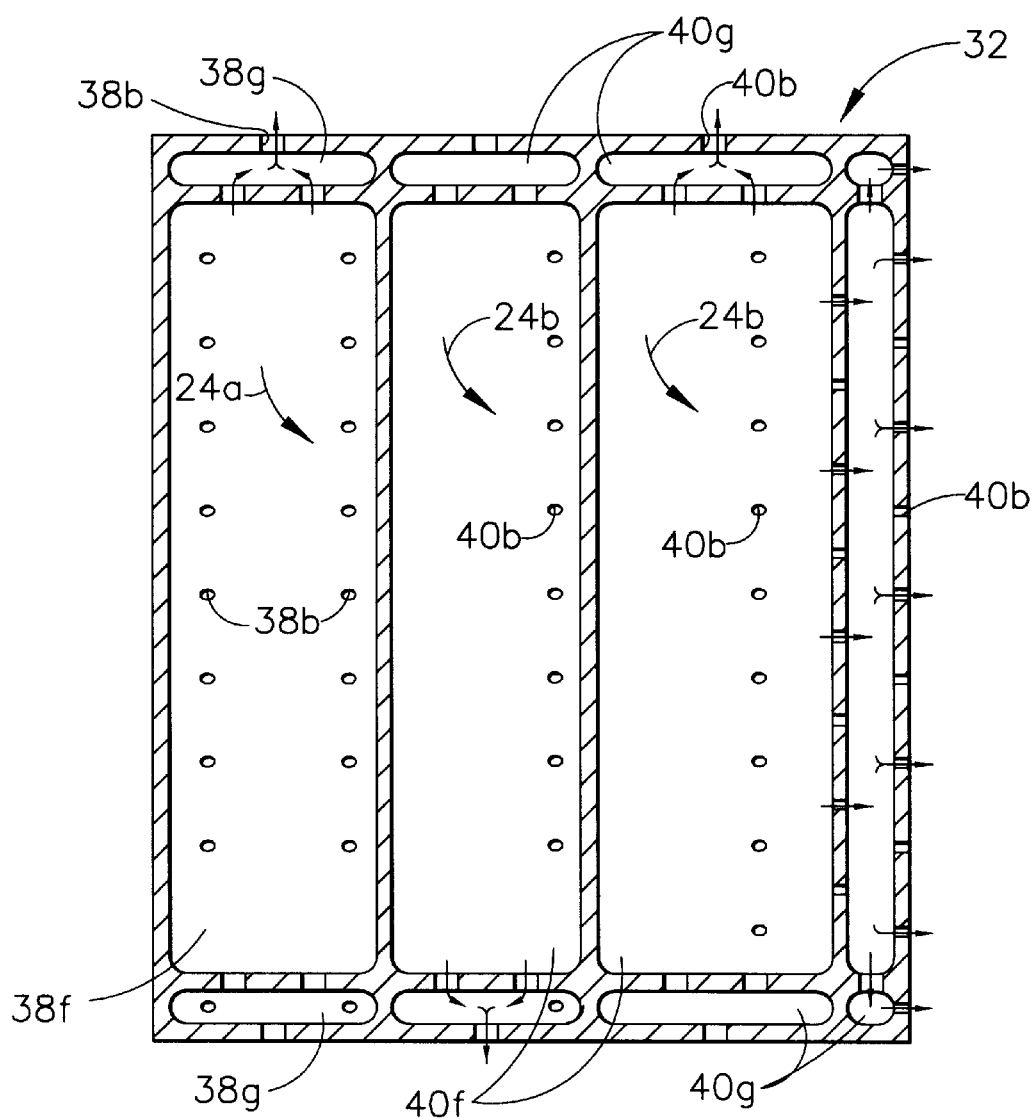
FIG. 4 is a partly sectional radial view through the turbine shroud illustrated in FIG. 2 and taken along line 4—4.

In the exemplary embodiment illustrated in FIG. 2, and in more detail in FIG. 4, the primary and secondary outlets 38b,40b may be inclined film cooling holes extending radially through the inner surface of the panels 32 for collectively providing a blanket of film cooling air for protection against the heat of the combustion gases 26. The film cooling holes may take any conventional configuration, and the inner surface of the panels 32 may be coated with a conventional thermal barrier coating (TBC) 46 for providing additional heat protection. The dual-source cooling of the present invention may be used with various cooling features embodied in the individual panels 32.

In accordance with another feature of the present invention as illustrated in FIGS. 2 and 4, the primary cooling circuit 38 further includes one or more primary chambers 38f disposed inside the panel 32 adjacent the forward hook 32a for distributing the primary air 24a from the inlets 38a to the several outlets 38b. Similarly, the secondary cooling circuit 40 includes one or more secondary chambers 40f inside the panel 32 aft of the primary chamber 38f and adjacent the aft hook 32b for distributing the secondary air 24b from the inlets 40a to the several outlets 40b. The axial extent of the primary and secondary chambers 38f,40f may be selected for best accommodating the axial drop in pressure of the combustion gases 26 flowing past the turbine blades 20a. The radial pressure drop across the individual primary and secondary outlets 38b,40b may now be better optimized for maximizing cooling performance of the film cooling holes with improved blowing ratios.

In the preferred embodiment illustrated in FIG. 4, the primary cooling circuit 38 includes one or more auxiliary or subchambers 38g disposed in flow communication with the primary chamber 38f along one or more of the circumferential edges of the panel 32. Some of the primary outlets 38b may extend circumferentially through the panel edge in flow communication with the subchamber 38g for better cooling the panel edges.

Similarly, the secondary cooling circuit 40 may include one or more auxiliary or subchambers 40g disposed inside the panel in flow communication with corresponding ones of the secondary chambers 40f along one or more of the edges of the panel. Some of the secondary outlets 40b may extend through the panel edge in flow communication with the secondary subchambers 40g for cooling the panel edges.

In the exemplary embodiment illustrated in FIG. 4, the subchambers extend along both circumferential edges of each panel 32 and along the aft edge of the panel for enhancing cooling thereof. The secondary subchambers 40g include two positioned at both aft corners of the panel 32 for providing enhanced cooling thereof.

Various advantages accrue to the improved turbine shrouds 30 disclosed above. Most significantly, two independent sources of cooling air at different pressures are provided for the individual shrouds 30 to accommodate the axial drop in pressure in the combustion gases 36 flowing past the turbine blades 20a for improving cooling effectiveness and efficiency of the shrouds 30. The cooling features in each panel 32 may be readily cast therein, with the panel 32 being sealingly joined to the corresponding hood 42. With the addition of the cooperating spoolie 44, the cooling air supply through the major portion of the individual shrouds 30 is sealed and isolated from the primary cooling flowpath at the forward end of the shrouds 30.

The pressure of the cooling air may then be better matched with the variable pressure of the combustion gas 26 as it passes the turbine blades 20a for improving cooling effectiveness. The isolated primary and secondary cooling flowpaths significantly reduce or eliminate undesirable cooling air leakage. Like a conventional turbine shroud, the improved turbine shroud 30 utilizes maximum pressure compressor discharge air 24a channeled to the forward end of the shroud which is required due to the high pressure of the combustion gas 26 at the forward end of the shroud 30. The primary air also purges the primary plenum 38c and provides cooling thereof.

Unlike a conventional turbine shroud, the second source bleed air 24b is used in addition to the primary air 24a for further improvement. Not only is the secondary air 24b at a lower pressure than the primary air 24a, but it has a lower temperature than the primary air 24a since it is less compressed. The lower temperature secondary air 24b further improves the cooling effectiveness of the shroud 30.

As indicated above, any cooling air bled from the compressor for cooling the turbine shrouds 30 necessarily decreases engine performance since it is not used in generating the combustion gases 26 from which energy is extracted. The improved cooling due to the turbine shrouds 30 of the present invention allow for a decrease in the amount of high pressure primary air 24a which may reduce the entire amount of cooling air needed in the turbine shrouds 30, and thereby increase engine efficiency. Although compressor interstage bleed air is now provided as a new source to the turbine shrouds 30, the amount of that air is less than the amount which would otherwise be required if additional compressor discharge air were used instead.

The improved cooling of the invention allows for the elimination of the conventional shroud isolation hangers described above, and the associated leakage of cooling air therefrom. Although conventional shroud hangars may be eliminated in the preferred embodiment, they may be used if desired in an alternate embodiment.

The shroud assembly 28 described above enjoys improved cooling using two cooling air sources at different pressure and temperature, and therefore reduces the need for extracting cooling air from the compressor and correspondingly improves engine performance and specific fuel consumption. While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A shroud for providing a flowpath boundary for hot combustion gases in a turbine of a gas turbine engine comprising:

a panel having a forward hook and an aft hook spaced therefrom;

means for channeling primary air at a first pressure through a portion of said panel; and means for independently channeling secondary air at a different pressure through another portion of said panel.

2. A shroud according to claim 1 further comprising a hood sealing joined to said panel between said forward and aft hooks to isolate said primary and secondary air channeling means from each other.

3. A shroud according to claim 2 wherein said primary and secondary air channeling means include two independent flowpaths to corresponding portions of a compressor for separately receiving air therefrom at different pressures.

4. A method of cooling a shroud providing a flowpath boundary for hot combustion gases in a turbine of a gas turbine engine comprising:

channeling primary air at a first pressure through a portion of said shroud; and independently channeling secondary air at a different second pressure through another portion of said shroud.

5. A method according to claim 4 wherein:

said turbine includes a rotor blade spaced from said shroud to define a tip can therebetween, and having a leading edge first receiving said combustion gases and a trailing edge spaced downstream therefrom; and said engine includes a multistage compressor for sequentially compressing air to increase pressure thereof to a maximum pressure at an outlet thereof; and said method further comprises:

channeling compressor discharge air from said compressor outlet as said primary air to a forward portion of said shroud corresponding with said blade leading edge; and channeling compressor bleed air from an intermediate stage of said compressor as said secondary air to an aft portion of said shroud corresponding with said blade trailing edge.

6. A shroud for providing a flowpath boundary for hot combustion gases in a turbine of a gas turbine engine comprising:

a panel having a forward hook and an aft hook spaced therefrom;

a primary cooling circuit extending through said panel adjacent said forward hook, and having a primary inlet for receiving primary air at a first pressure, and a primary outlet for discharging said primary air; and a secondary cooling circuit extending through said panel adjacent said aft hook independently of said primary circuit, and having a secondary inlet for receiving secondary air at a second pressure different than said first pressure, and a secondary outlet for discharging said secondary air.

7. A shroud according to claim 6 wherein said secondary cooling circuit includes a hood sealingly joined to said panel between said forward and aft hooks to define a secondary plenum for channeling said secondary air to said secondary inlet.

8. A shroud according to claim 7 in combination with a shroud support disposed radially outwardly of said shroud for positioning said shroud radially outwardly of a rotor blade of said turbine; and wherein said shroud support includes forward and aft hooks extending from a band and engaging said panel forward and aft hooks, respectively, to define a primary plenum surrounding said hood; and said shroud support further includes primary and secondary distribution holes disposed in flow communication with said primary and secondary plenums, respectively, for independently channeling said primary and secondary air thereto.

9. An apparatus according to claim 8 further comprising:

a multistage compressor for sequentially compressing air to increase pressure thereof to a maximum pressure at an outlet thereof;

a primary supply channel disposed in flow communication between said compressor outlet and said primary distribution hole for channeling compressor discharge air as said primary air to said shroud; and a secondary supply channel disposed in flow communication between an intermediate stage of said compressor and said secondary distribution hole for channeling compressor bleed air from said compressor outlet to said shroud as said secondary air at a lower pressure than said primary air.

10. An apparatus according to claim 8 further comprising a tubular spoolie extending through said primary plenum in flow communication between said secondary distribution hole and said hood to channel said secondary air to said secondary inlet.

11. An apparatus according to claim 8 wherein:

said primary cooling circuit further includes a chamber inside said panel for distributing said primary air to a plurality of said primary outlets; and said secondary cooling circuit further includes a chamber inside said panel for distributing said secondary air to a plurality of said secondary outlets.

12. An apparatus according to claim 11 wherein said primary and secondary outlets comprise film cooling holes extending through said panel.

13. An apparatus according to claim 11 wherein:

said primary cooling circuit further includes a subchamber disposed in flow communication with said primary chamber along an edge of said panel, and said primary outlet extends therethrough in flow communication with said primary subchamber; and said secondary cooling circuit further includes a subchamber disposed in flow communication with said secondary chamber along an edge of said panel, and said secondary outlet extends therethrough in flow communication with said secondary subchamber.

* * * * *